US008884913B2

(12) United States Patent
Saynac et al.

(10) Patent No.: US 8,884,913 B2
(45) Date of Patent: Nov. 11, 2014

(54) SYSTEMS AND METHODS FOR DETERMINING THE LOCATION AND PRESSURE OF A TOUCHLOAD APPLIED TO A TOUCHPAD

(75) Inventors: Xavier Pierre-Emmanuel Saynac, Lyons (FR); Arpad Kormendy, Fredericton (CA); Adam Joseph MacDonald, Fredericton (CA); Kumaran Thillainadarajah, Fredericton (CA)

(73) Assignee: Smart Skin Technologies, Fredricton (CA)

( * ) Notice: Subject to any disclaimer, the term of this patent is extended or adjusted under 35 U.S.C. 154(b) by 372 days.

(21) Appl. No.: 13/052,979

(22) Filed: Mar. 21, 2011

(65) Prior Publication Data

US 2011/0260994 A1 Oct. 27, 2011

Related U.S. Application Data

(60) Provisional application No. 61/315,750, filed on Mar. 19, 2010.

(51) Int. Cl.
| | |
|---|---|
| G06F 3/045 | (2006.01) |
| G06F 21/36 | (2013.01) |
| G06F 21/83 | (2013.01) |
| G06F 3/041 | (2006.01) |

(52) U.S. Cl.
CPC .... *G06F 3/0414* (2013.01); *G06F 2203/04103* (2013.01); *G06F 2203/04104* (2013.01); *G06F 21/36* (2013.01); *G06F 21/83* (2013.01)
USPC ........................................ 345/174; 178/18.01

(58) Field of Classification Search
USPC ........................................ 345/174; 178/18.05
See application file for complete search history.

(56) References Cited

U.S. PATENT DOCUMENTS

| | | | |
|---|---|---|---|
| 5,505,072 | A | 4/1996 | Oreper |
| 6,239,389 | B1 | 5/2001 | Allen et al. |
| 6,826,968 | B2 | 12/2004 | Manaresi et al. |
| 7,430,925 | B2 | 10/2008 | Son et al. |
| 7,926,364 | B2 * | 4/2011 | Joung ...................... 73/862.046 |

(Continued)

*Primary Examiner* — Adam J Snyder
(74) *Attorney, Agent, or Firm* — Lewis, Rice & Fingersh, L.C.

(57) ABSTRACT

A computing device with a multi-touch touch interface having a plurality of rows of contact points and a plurality of columns of contact points. For each other row of contact points, every contact point in the row is connected to form a row sensor. For each other column of contact points, every contact point in the column that is not part of a row sensor is connected to form a column sensor. The contact points that are not part of a row sensor and not part of a column sensor are connected together to form at least one shape sensor. A computing device with a multi-touch touch interface having a plurality of contact points has at least one layer of piezoresistive material, an insulating structure disposed between the plurality of contact points and the piezoresistive material, and a gap between the plurality of contact points and piezoresistive material. A method of providing multi-layered password recognition for a computing device having a touch interface first provides a passcode associated with an alphanumeric symbol to the computing device. The alphanumeric symbol is associated with a passcode pressure level. A touch load is applied to the touch interface and a measured pressure level associated with the applied touch load is determined. Then it is determined whether the measured pressure level corresponds to the passcode pressure level associated with the alphanumeric symbol of the passcode.

19 Claims, 15 Drawing Sheets

(56) References Cited

U.S. PATENT DOCUMENTS

| | | | |
|---|---|---|---|
| 7,982,723 B2* | 7/2011 | Ningrat | 345/174 |
| 8,072,429 B2* | 12/2011 | Grivna | 345/173 |
| 8,161,826 B1 | 4/2012 | Taylor | |
| 8,258,986 B2* | 9/2012 | Makovetskyy | 345/173 |
| 8,284,080 B2* | 10/2012 | Ng et al. | 345/173 |
| 2007/0235231 A1* | 10/2007 | Loomis et al. | 178/18.06 |
| 2007/0236330 A1* | 10/2007 | Cho et al. | 340/5.54 |
| 2008/0150906 A1* | 6/2008 | Grivna | 345/173 |
| 2009/0027353 A1 | 1/2009 | Im et al. | |
| 2009/0237374 A1 | 9/2009 | Li et al. | |
| 2009/0256821 A1* | 10/2009 | Mamba et al. | 345/174 |
| 2009/0284398 A1* | 11/2009 | Shen et al. | 341/33 |
| 2010/0019780 A1* | 1/2010 | Bulea | 324/662 |
| 2010/0037709 A1* | 2/2010 | Yeh et al. | 73/862.046 |
| 2010/0050784 A1* | 3/2010 | Joung | 73/862.046 |
| 2010/0066572 A1 | 3/2010 | Dietz et al. | |
| 2010/0066701 A1* | 3/2010 | Ningrat | 345/174 |
| 2011/0192657 A1* | 8/2011 | Chen et al. | 178/18.06 |
| 2011/0271772 A1 | 11/2011 | Parks et al. | |
| 2012/0044095 A1* | 2/2012 | Makovetskyy | 341/33 |
| 2012/0162122 A1 | 6/2012 | Geaghan | |
| 2012/0323501 A1 | 12/2012 | Sarrafzadeh et al. | |

* cited by examiner

SCHEMATIC OF SENSOR ARRAY

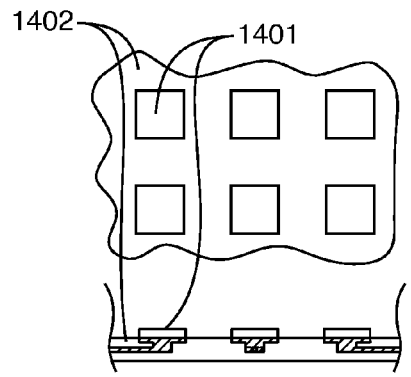
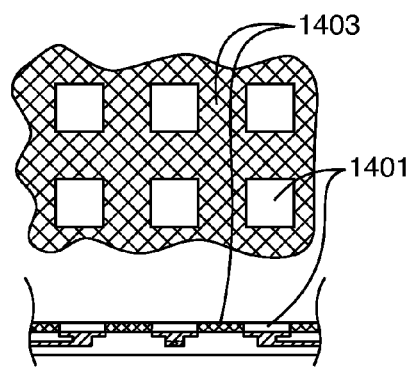
FIG. 14A  FIG. 14B
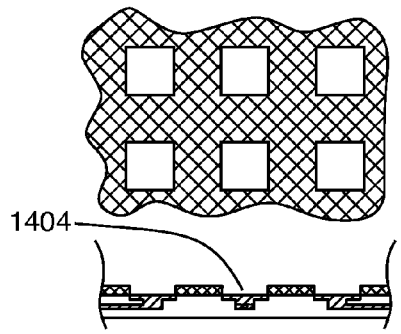
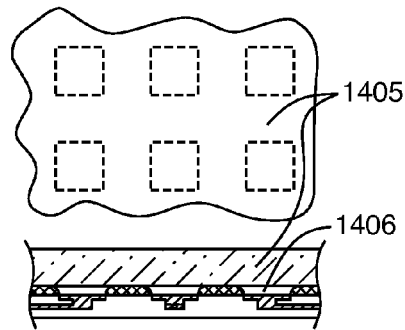
FIG. 14C  FIG. 14D

SYSTEMS AND METHODS FOR DETERMINING THE LOCATION AND PRESSURE OF A TOUCHLOAD APPLIED TO A TOUCHPAD

CROSS REFERENCE TO RELATED APPLICATION(S)

This application claims the benefit of U.S. Provisional Patent Application Ser. No. 61/315,750, filed Mar. 19, 2010, the entire disclosure of which is incorporated herein by reference.

BACKGROUND

1. Field of the Invention

The embodiments, described herein relate to user interfaces. More particularly, the systems and methods herein relate to touch interfaces that are able to register multiple, simultaneous touches. Some embodiments described herein relate to pressure-sensitive touch interfaces.

2. Description of the Related Art

Existing row/column touchpad approaches have limitations on registering multiple touches. A third touch position which falls on the same rows and columns as two existing touches will not be registered.

Furthermore, most consumer touch interface devices use capacitive sensing, which are typically not pressure-sensitive because of the sensitivity limitations inherent in capacitive solutions. A pressure-sensitive touch interface would increase the functionality of a touch interface through the use of touches of varying pressure (i.e. using a "hard" touch as opposed to a "soft touch" to bring up a background menu control).

Although current resistive technology can be pressure-sensitive, resistive solutions are not common in practice because of light-touch sensitivity limitations.

Piezoresistive materials are typically not used in touch interface devices since they have a pressure-sensitive resistance that is typically responsive only to pressures higher than that of a light touch. As a result, simply adding a sensor to a piezoresistive material may result in a touch interface that is difficult to use in practice because the user must press very hard to obtain a response.

SUMMARY

The embodiments described herein provide in one aspect, a computing device having a multi-touch touch interface, the computing device comprising:
  a plurality of rows of contact points;
  a plurality of columns of contact points;
  wherein for each other row of contact points, every contact point in the row is connected to form a row sensor;
  wherein for each other column of contact points, every contact point in the column that is not part of a row sensor is connected to form a column sensor; and
  wherein the contact points that are not part of a row sensor and not part of a column sensor are connected together to form at least one shape sensor.

The embodiments described herein provide in another aspect, a method of constructing a layout of contact points for a computing device having a multi-touch touchpad, the method comprising:
  providing a plurality of rows of contact points;
  providing a plurality of columns of contact points;
  for each other row of contact points, connecting every contact point in the row to form a row sensor;
  for each other column of contact points, connecting every contact point in the column that is not part of a row sensor to form a column sensor;
  connecting the remaining contact points that are not part of a row sensor and not part of a column sensor to form at least one shape sensor.

The embodiments described herein provide in another aspect, a computing device having a multi-touch touchpad, the computing device comprising:
  a plurality of contact points;
  at least one layer of piezoresistive material;
  an insulating structure disposed between the plurality of contact points and the piezoresistive material; and
  a gap between the plurality of contact points and piezoresistive material.

The embodiments described herein provide in another aspect, a method of determining a pressure load in response to a touch load on a touch interface of a computing device:
  providing a plurality of contact points;
  providing at least one layer of piezoresistive material;
  providing an insulating structure between the plurality of contact points and the piezoresistive material;
  providing a gap between the plurality of contact points and the piezoresistive material;
  deforming the piezoresistive material and placing at least one contact point in contact with the piezoresistive material in response to the touch load; and
  determining the pressure of the touch load The embodiments described herein provide in another aspect, a method of providing multi-layered password recognition for a computing device having a touch interface, the method comprising:
  providing a passcode to the computing device, wherein the passcode is associated with at least one alphanumeric symbol and the at least one alphanumeric symbol is associated with at least one passcode pressure level;
  applying at least one touch load to the touch interface; and
  for each touch load applied to the touch interface,
    determining a measured pressure level associated with the applied touch load, and determining whether the measured pressure level corresponds to the passcode pressure level associated with the at least one alphanumeric symbol of the passcode.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one example embodiment, and in which:

FIGS. 14A to 14D illustrate the components utilized by a silkscreen process to create the raised structure according to at least one embodiment.

Figure 1:
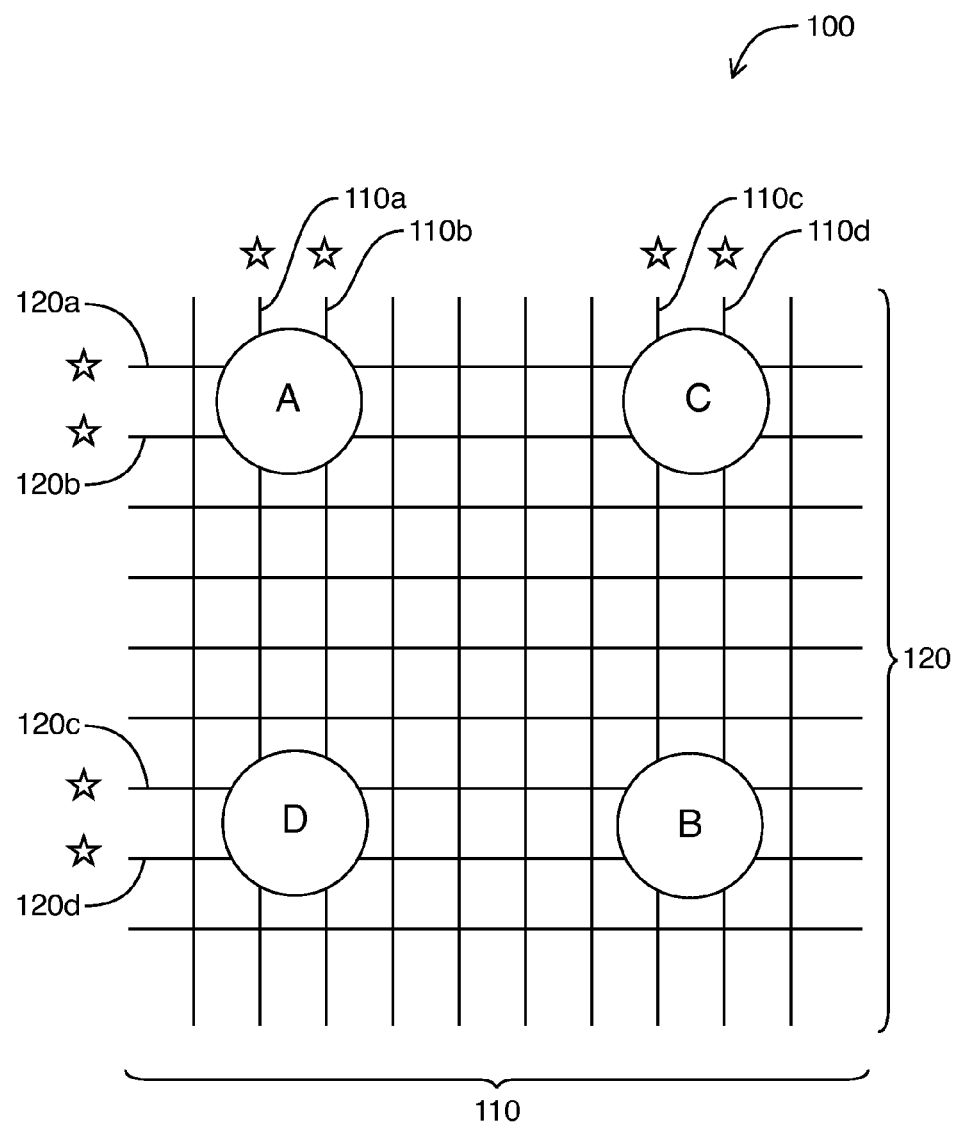
FIG. 1 is a schematic diagram of prior art that may be utilized as part of a touch interface.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF PREFERRED EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Some embodiments described herein relate to user interfaces for computing devices. Some embodiments described herein relate to user interfaces for touchscreens for computing devices. Some embodiments described herein relate to user touch interfaces for computing devices that are not part of a touchscreen but may be used in conjunction with a touchscreen (in some such embodiments, the computing device need not have a touchscreen). Computing devices can include but are not limited to personal computers, laptops, mobile devices, and gaming devices. Mobile devices can include, but are not limited to, mobile phones, smart phones, PDAs, and portable gaming devices.

Known touch interface devices (i.e. touchscreens and touch pads) read inputs on two dimensions using sensors (arbitrary measuring devices of various technologies) which are abstractly connected in rows and columns. The information extracted from the device can allow one to accurately and reliably determine the location of up to two touches. The exact mechanism that is used to determine that a touch has been made can vary depending on the technology used. Those skilled in the art will understand that touch interface devices can comprise, for example, but are not limited to, resistive technology and capacitive technologies (i.e. surface capacitance or projected capacitance).

Reference is made to FIG. 1, which is a schematic diagram of a grid 100 that may be utilized as part of a known touch interface, such as for example, but not limited to, a touchscreen. Grid 100 comprises a plurality of columns 110 and a plurality of rows 120. Columns 110 and rows 120 can comprise any appropriate material including but not limited to conductive traces, wires or individual conductive points connected by a traces or wires.

When the interface of FIG. 1 is touched at point A, columns 110a and 110b as well as rows 120a and 120b are activated, thereby recognizing the location of the touch of point A. The exact mechanism that is used to determine that a touch has been made can vary depending on the technology used.

In applications where pressure is also measured such a grid design can allow one to determine the pressure of only a single touch. The inventors have recognized that using clever software to extrapolate additional information, the location and pressure of additional presses can be estimated, but accuracy and reliability is significantly reduced.

As mentioned above, the inventors have identified a problem with known touch interfaces that for example use grid designs such as grid 100. For example, known touch interfaces have limited ability to register multiple touches. Specifically, referring to FIG. 1, if points A and B are touched concurrently, grid 100 may not recognize a concurrent touch at either points C or D given that point C and D each activate rows and columns that are already activated by either point A or B.

Figure 2:
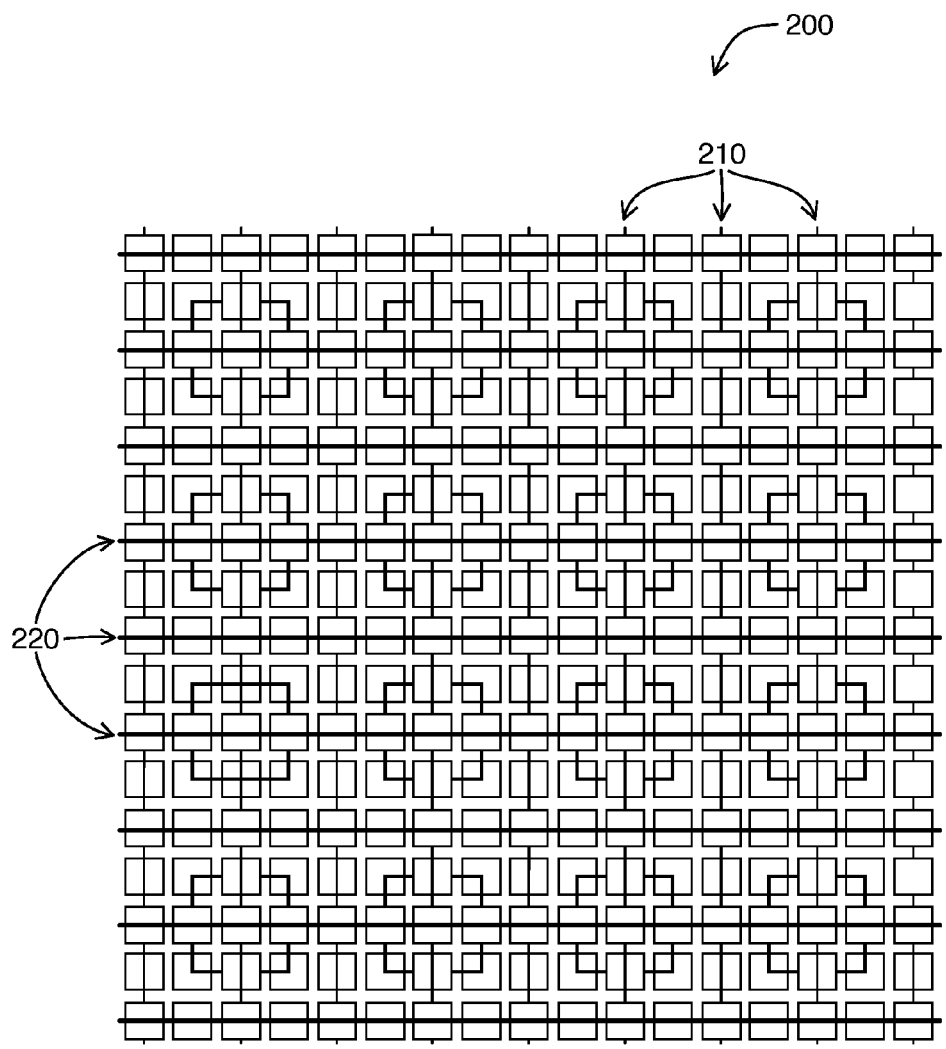
FIG. 2 is a schematic diagram of a grid for use with a user touch interface according to at least one embodiment.

Reference is now made to FIG. 2, which is a schematic diagram of a grid 200, according to various embodiments. The connections between all of the sensors have been omitted, but are shown in detail in FIG. 4. Grid 200 comprises a plurality of columns 210, a plurality of rows 220, and a plurality of squares 230. It should be understood that although squares are illustrated in FIG. 2 and referred to in the embodiments described herein, any appropriate shape such as, for example, but not limited to, circles, hexagons, octagons, can be used. The use of the terms "rows" and "columns" is used to describe the generally orthogonal orientation of these groups of sensors to each other in at least one embodiment and is not meant to limit the embodiments herein described. Furthermore, in at least one embodiment, the "rows" and "columns" are not straight lines, but any abstract structure that stretches from one side of the device to the other, in both the X and Y directions, and in which there are a plurality of connections that with enough room for shape sensors. One example of such an abstract structure would be a hex-grid.

Other Rows 220, columns 210 and squares 230 may be comprised of a plurality of sensor contact points for a total of X*Y sensor contact points. In some embodiments, the sensor contact points can comprise small pieces of copper. In some embodiments, any appropriate conductive metal can be used. In some embodiments, the sensor contact points may be physical contact points. However, the sensor contact points are not limited to physical contact points and may be any type of sensor contact point suitable for the embodiment.

As will be understood by those skilled in the art, grid 200 is scalable. Using the layout of grid 200, a device can accurately report the locations of all simultaneous presses. The exact pressure of all presses may not be determined accurately in all cases; however, the design permits the relative pressure to be determined accurately. In addition, the absolute pressure can be estimated with a much higher degree of reliability than the traditional approach.

Figure 3:
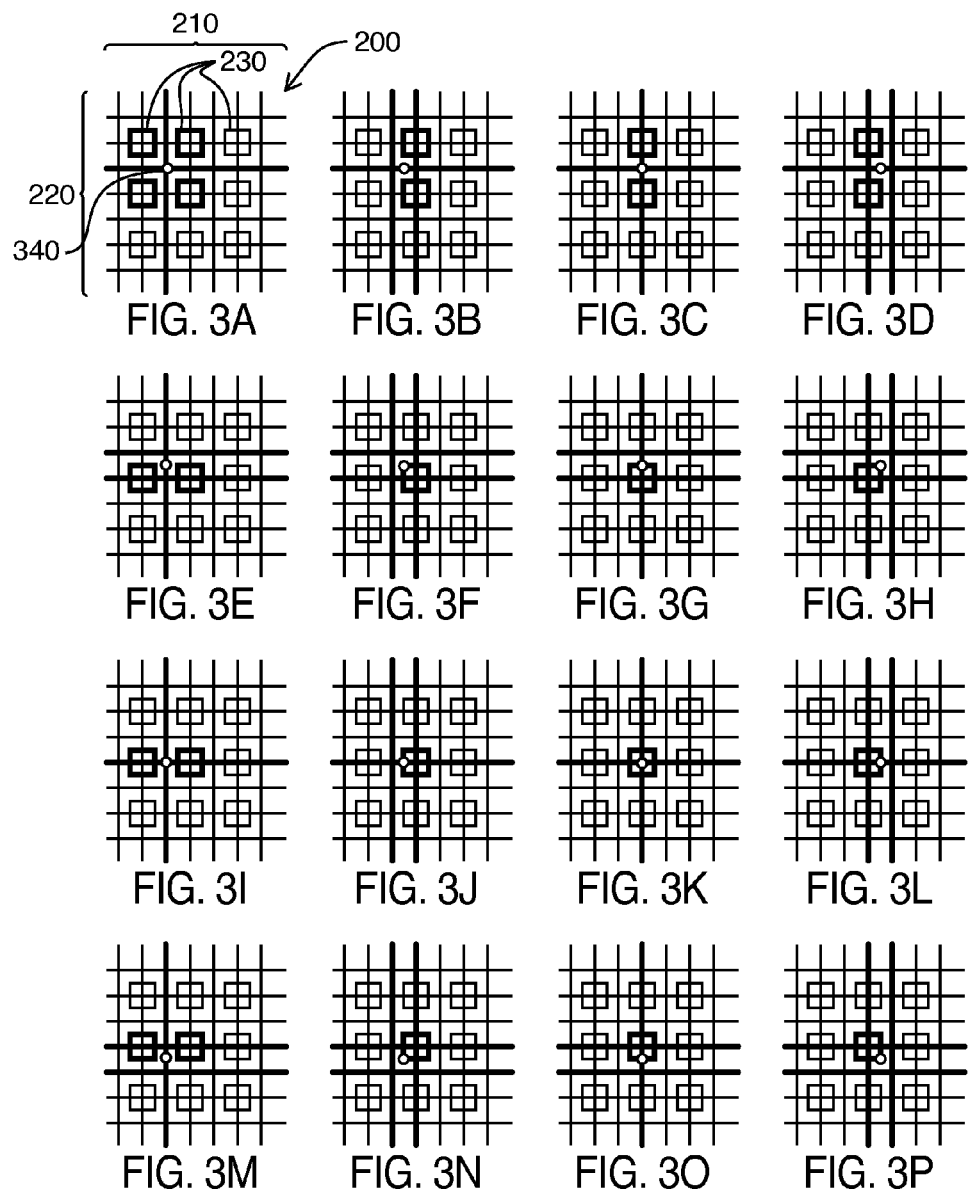
FIGS. 3A to 3P are schematic diagrams of the grid of FIG. 2 according to at least one embodiment.

Reference is now made to FIGS. 3A to 3P, which are schematic diagrams of a grid 200, according to various embodiments. A previously discussed, grid 200 comprises a plurality of columns 210, a plurality of rows 220, and a plurality of squares 230. Thus, although grid 200 is referred to a "grid" it is not to be confused with other grids such as grid 100 which include only rows and columns.

A point at which the grid is touched and a load is applied (i.e. a "touch load") is comprised of a plurality of activate contact points, individually shown at 340 and referred to as a "touch point". Each figure illustrates touch point 340 at a different location of the touch interface and each touch point corresponds to a sensor contact point. FIGS. 3A to 3P illustrate 16 different combinations of touch points in relation to a square 230. As can be seen from the figures, for each touch point 340, one or more columns 210 is activated, one or more rows 220 is activated, and one or more squares 230 is activated. Depending on the location of touch point 340, the number of squares 230 activated by a touch point can be 1, 2 or 4. The number of squares 230 that are activated can be more than 4 depending on the size of the object making the touch and the scale of grid 200.

The location of the touch point can be determined based on which of the columns 210, rows 220, and squares 230 are activated. In alternative embodiments, it is possible to use individual sensor points distributed across the touch interface instead of grid 200, where each sensor point can be individually monitored. This is not to be confused with a grid made in accordance with grid 200 that is comprised of individual sensor contact points that are coupled together to form a grid in accordance with grid 200. However, for a comparable touch interface in terms of scale and performance, the use of individual sensors contact points that are each individually and separately monitored as opposed to grid 200 requires a greater amount of circuitry and complexity. Accordingly, as described in more detail later below, grid 200 allows for a relatively simple circuit to be used in that only the individual columns 210, rows 220, and squares 230 need to be monitored and yet touch locations can be determined relatively accurately.

The elements (e.g. the columns 210, rows 220, and squares 230) of grid 200 can be monitored in any appropriate manner. For example, in various embodiments, any appropriate sensing circuitry of measuring devices coupled to the elements of grid 200 can be used. The sensing circuitry can, for example, comprise any appropriate processor.

In some embodiments, grid 200 can be incorporated in any appropriate touch interface. In some embodiments, grid 200 can be incorporated in a touchscreen such as those used in a mobile device. Grid 200 can be used in conjunction with any appropriate technology for a touchscreen including but not limited to: resistive technology and capacitive technologies (e.g. surface capacitance or projected capacitance).

In some embodiments the pressure of a touch is also determined. In some embodiments, the touch interface comprises a piezoresistive material. In some such embodiments, the location and pressure of any particular touch point can be identified. In some embodiments that do not use a piezoresistive material the location and pressure of a touch can also be determined.

Figure 4:
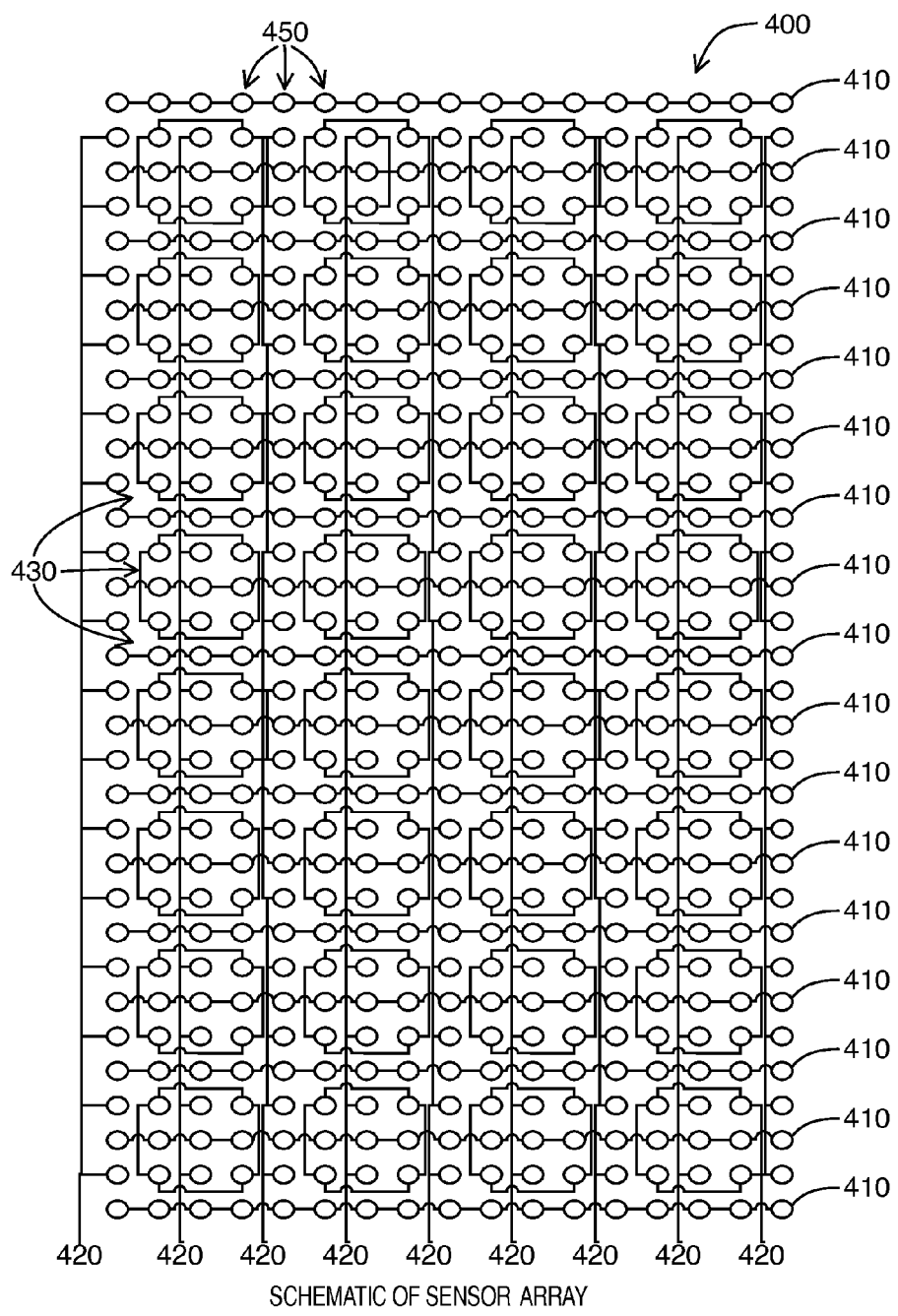
FIG. 4 is a schematic diagram of a sensor array according to various embodiments.

Reference is now made to FIG. 4, a schematic diagram of a sensor array 400 comprised of X*Y sensor contact points 450, according to one embodiment, arranged in the column, row and square arrangement of grid 200 discussed in relation to FIG. 2. Although 16 columns, 8 rows and 32 squares are illustrated, it should be understood that any number of columns, rows and squares could be used.

Sensor contact points 450 are connected together such that multiple sensor contact points on the grid essentially become the same sensor. Specifically, all the sensor contact points in every other row are connected together to create Y/2 unique row sensors 410, using half of the total sensor contact points of grid 200. All the sensor contact points in every other column, excluding those already part of a row sensor, are connected together to form X/2 unique column sensors 420. This results in X/2 columns, using ¼ of the total sensor contact points. The columns are less dense than the rows, meaning that the layout is not identical if turned 90 degrees. The remaining ¼ unconnected points that fall between row sensors 410 and column sensors 420 are connected together, in this embodiment, in [X*Y/16] groups of 4. When connected, these groups of sensor contact points generally look like squares. These groups are illustrated in FIG. 4 as square sensors 430. As mentioned above, the shape produced by connecting the remaining sensor contact points is not limited to squares. In other embodiments, the remaining sensor contact points are grouped and connected together to form shapes appropriate to the touch interface of that particular embodiment.

This configuration reduces a grid of X*Y sensor contact points to X/2+Y/2+X*Y/16 unique sensors (i.e. row sensors, column sensors, square sensors), which can be read into a hardware or software interface to determine the location of multiple touches when using the mapping algorithm described later in this application. This results in reducing the number of measurements that are required to read the complete surface of the touch interface, while providing adequate capability to measure the location and pressure of multiple touches simultaneously.

In some embodiments, the sensor grid is scaled such that the row, column and shape sensors are significantly smaller than the object applying the touch load to the grid (i.e. finger, stylus, pencil). In these embodiments, the touch load contacts at least one row, column and shape sensor simultaneously, which allows each touch to be measured uniquely.

In some embodiments, sensor array 400 is used as part of a resistive touch interface. In some embodiments, this is achieved by using sensor array 400 in conjunction with a conductive material that situated above the sensor array. In some embodiments, the material itself is not conductive but can for example have a conductive undercoating or conductive traces or any other appropriate way of making the bottom surface of the material at least partially conductive. When a touch event occurs, the conductive material contacts one or more of the sensor contact points 450 causing a circuit to be formed. The circuit can be a voltage divider for example. By measuring the voltage on the various row, column and square sensors one can determine the location of the touch.

In some embodiments a piezoresistive material is used. In some such embodiments, the voltage divider circuit provides information regarding the pressure with which the touch is made. Specifically, the voltage read on the column, row and square will change as the pressure is applied to the material. Similarly, in these embodiments, the pressure will affect the resistance of the material and the voltage will change according to the pressure applied to the material. As more pressure is applied to the material, the material makes better contact with the contact points 450 and the surface contact resistance is lowered. Similarly, the more pressure applied to the material, the more the material's resistance is lowered.

As those skilled in the art will understand, the use of different types of material may require minor modifications to the electronics and/or software to account for the different properties of the material (e.g. conductive versus piezoresistive).

Figure 6:
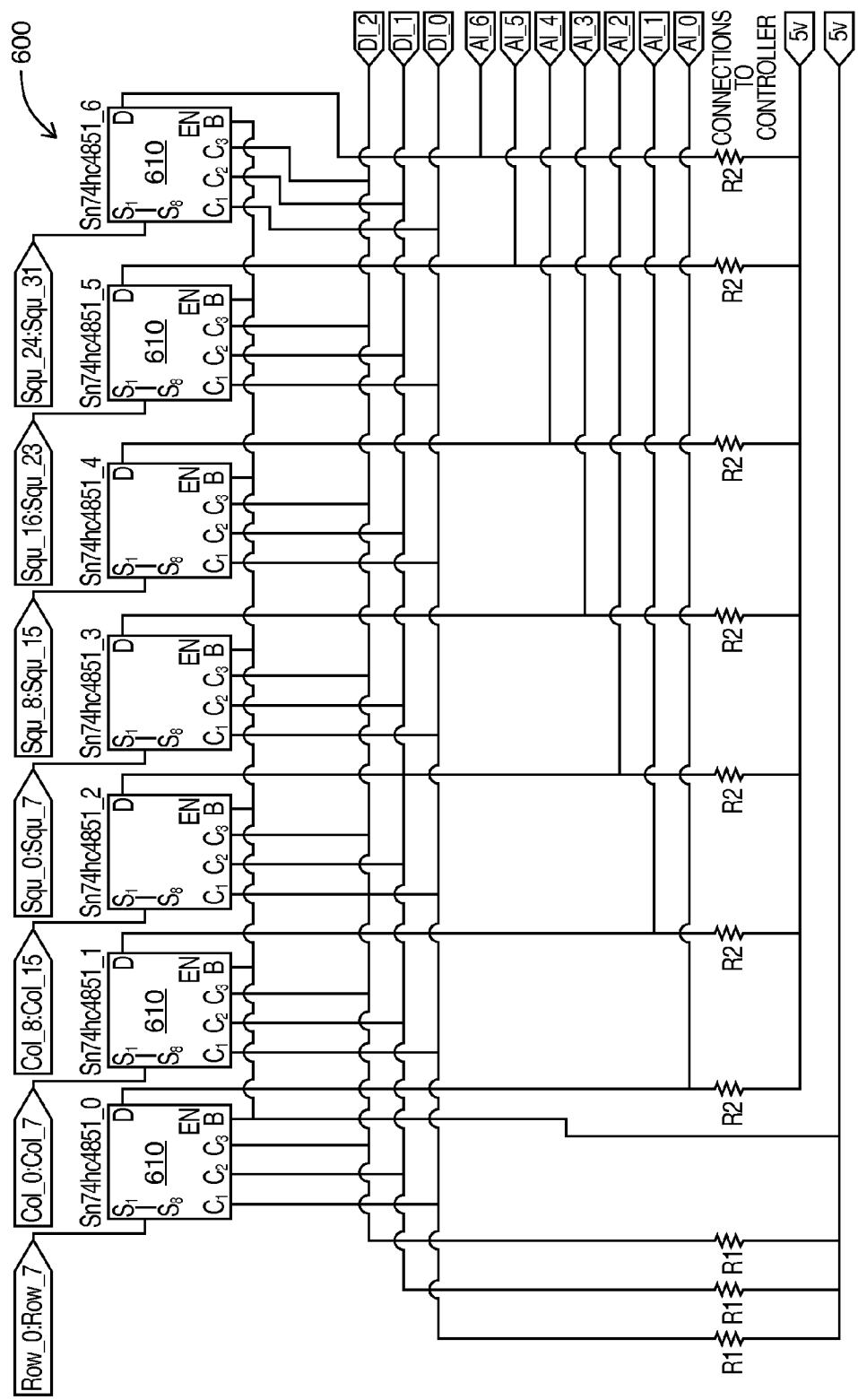
FIG. 6 illustrates a schematic diagram of a circuit that can be used in conjunction with the sensor array of FIG. 4.

Reference is now made to FIG. 6, which illustrates a schematic diagram of a circuit 600 that can be used in conjunction with sensor array 400 of FIG. 4. As can be seen from the figure, circuit 600 comprises a plurality of multiplexers 610, and a plurality of resistors of two values R1 and R2.

In the embodiments illustrated in FIGS. 4 and 6, 512 sensors are divided into 8 rows, 16 columns, and 32 squares. This configuration provides 56 inputs. This pattern scales linearly in two dimensions and provides a practical approach for small and large-sized surfaces. In this embodiment, the 56 analog inputs are connected to 7 8-to-1 multiplexers 610, which provide direct signals to 7 10-bit analog-to-digital ports on a microcontroller.

Figure 5:
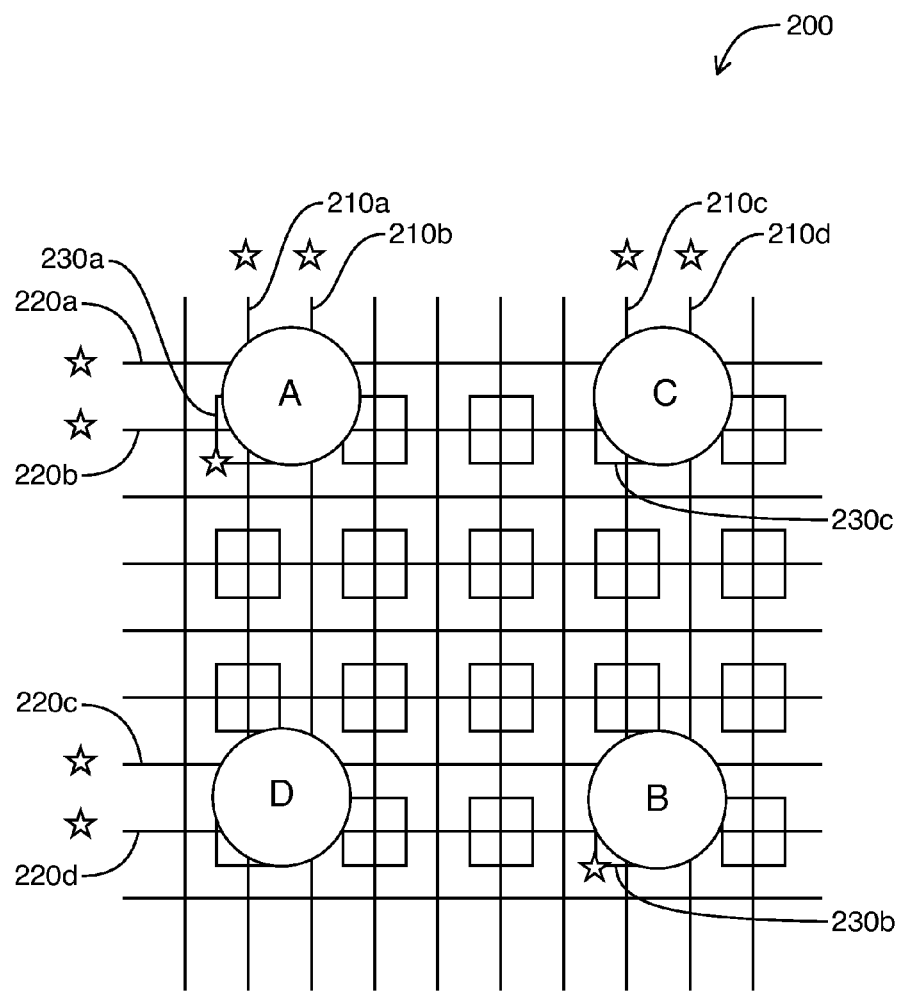
FIG. 5 is a schematic diagram of the grid of FIG. 2.
Figure 7:
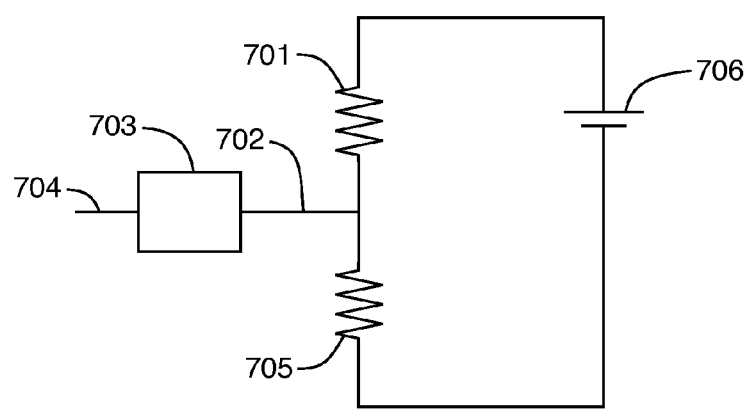
FIG. 7 illustrates a single sensor circuit of FIG. 6 according to various embodiments.

Reference is now made to FIG. 7, which illustrates a single sensor circuit of FIG. 6 for embodiments in which a piezoresistive or other conductive material is used in conjunction with sensor array 500 of FIG. 5. The resistance of the piezoresistive material is represented by 705. In one embodiment, output voltage signal (Vo) 704 is measured for each row sensor, column sensor and square sensor as they are activated by a touch load. This FIG. will be discussed in greater detail below.

Reference is now made to FIG. 5, which is a schematic diagram of grid 200 of FIG. 2, according to various embodiments. When the interface is touched at point A, columns 210*a* and 210*b* as well as rows 220*a* and 220*b* are activated. In addition, square 230*a* is also activated. Similarly, when the interface is touched at point B, columns 210*c* and 210*d* as well as rows 220*c* and 220*d* are activated. In addition, square 230*b* is also activated.

If while points A and B are touched, point C is touched, no new rows or columns will be activated. However, square 230*c* will be activated. Accordingly, the touch at point C can be recognized by the activation of square 230*c*.

As described earlier, each respective row, column and square of connected sensor contact points forms a unique row sensor, column sensor and square sensor. Each row sensor, column sensor and square sensor is associated with a unique sensor location index value (i.e. a row sensor location index value, a column sensor location index value and a square sensor location index value). When a touch load is applied, at least one row sensor, at least one column sensor and at least one square sensor are activated. It is important to note that activation of a sensor is not necessarily defined in terms of "on" or "off", since it is common to treat rows as partially activated for the purpose of pressure sensitivity or local smoothing.

The determination of which row, column or square sensors are activated is based upon the measured output voltage (Vo). Since each touch point is associated with the activation of at least one row sensor, at least one column sensor and at least one square sensor, its location is also associated with the row sensor location index value(s), column location index value(s) and square location index values(s) of the activated sensors.

Once the activated row, column and square sensors have been determined, the location of the at least one touch point, in terms of its associated sensor contact points, can be determined. A sensor contact point location index for the touch point can be generated based on the combined row sensor location index, column sensor location index and square sensor location index values of the activated rows, columns and squares. This individual location index is comprised of at least one row location value, at least one column location value and at least one square location value. Each sensor contact point location index is unique to the location of a particular touch point (i.e. sensor contact point) on the grid.

In order to determine a touch point's sensor contact point location index, the row sensor location index, column sensor location index and square sensor location index values must be mapped back to that particular associated sensor contact point. If the sensor contact point is part of a row sensor, then the row location value will be the row sensor location value of that row (i.e. FIG. 3B). If the sensor contact point is not part of a row sensor, then its row location value will be the row sensor location index values of both adjacent rows (i.e. FIG. 3M). If the sensor contact point is part of a column sensor, then its column location value will be the column sensor location index value of that column (i.e. 3E). Otherwise, it will be the column sensor location index values of both adjacent column sensors (i.e. FIG. 3B). If the sensor contact point is located within a square or part of that square sensor (i.e. connected to another sensor contact point within that square sensor), the square location value will be that square's sensor location index value (i.e. FIGS. 3K, 3H). If the sensor contact point is between two squares on an edge, then its square location value will be the sensor location index values of both adjacent square sensors (i.e. FIG. 3E). Otherwise, if the sensor contact point lies between four square sensors, then its square sensor value is the sensor location index values of those four square sensors (i.e. FIG. 3A).

As a result, each sensor contact point on the grid (i.e. grid 200) will map to between 3 and 8 sensors, some of which will be rows, columns and square sensors. For example, the sensor contact point location index for the touch point illustrated in FIG. 3F has two row location values, two column location values and one square location value.

To determine the actual value of the touch load or any other value measured by the row, column and square sensors (i.e. resistance, pressure), any combining formula suitable for the particular touch interface (i.e. finger touch pad, foot touch pad, etc.) can be used. Examples of suitable combining methods include, but are not limited to, addition, weighted sum, and averaging.

Figure 8:
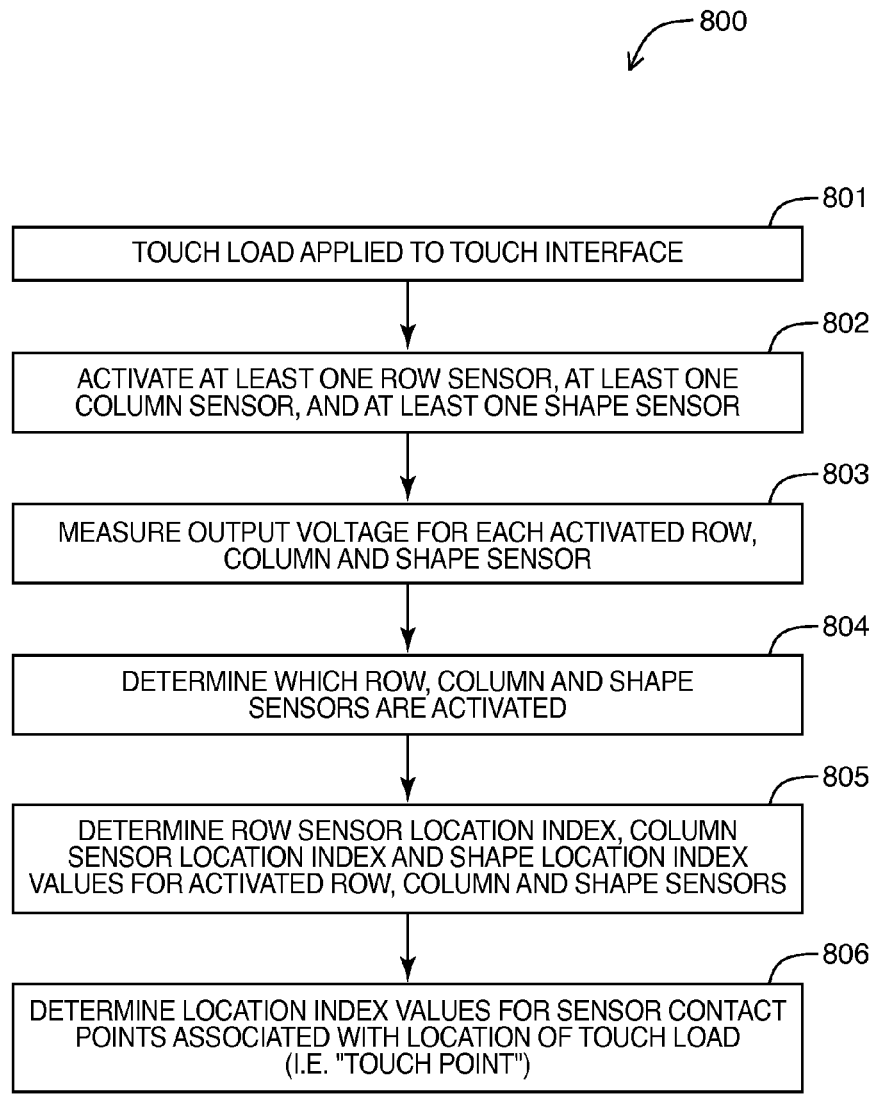
FIG. 8 is flowchart illustrating the steps taken by a computing device constructed according to an exemplary embodiment to determine the location of a touch load applied to its touch interface.

FIG. 8 is a flowchart that illustrates the steps 800 taken to determine the location of a touch load (i.e. touch point) applied to a touch interface of an exemplary embodiment. The process begins at step (801), where a touch load is applied to the touch interface. At step (802), at least one row sensor, at least one column sensor and at least one shape sensor (for example, but not limited to, a square shaped sensor) are activated in response to the applied touch load. At steps (803) and (804), the output voltage of each row, column and shape sensor is measured to determine which sensors were activated by the touch load. At step (805), the row sensor location index, column sensor location index and shape location index values of the activated rows are determined. At step (806), these index values are mapped onto the individual sensor contact points associated with the location of the applied touch load by determining each sensor contact point's location index.

Some embodiments herein described relate to a method of using a pressure-sensitive material in conjunction with a layout of sensors to create a pressure-sensitive touch interface and a computing device constructed according to this method. Using this computing device, the pressure resulting from a touch load applied to the interface can be determined. Any sensor contact point layout may be used in conjunction with this method and device, including the sensor contact point layout of grid 200. These sensors could also be any collection of one or more metal contact points. In some embodiments, this method can be utilized in conjunction with mobile device user interfaces.

Piezoresistive materials refer to any material, either a uniform chemically created material, or a complex combination of materials, that changes electrical resistance when a pressure and a voltage is applied. One method of producing a piezoresistive material involves using carbon nanotubes.

Piezoresistive materials are not typically used for touch interface applications since the pressure-sensitive resistance of the material is usually responsive only to a range of pressures higher than that produced by a light finger touch. As a result of this high pressure-sensitive resistance, simply applying a sensor to a piezoresistive material may result in a touch interface that is difficult to use in practice because the user must press very hard to obtain a response. As a result of this problem, most consumer touch interface devices use capacitive sensing, which is not pressure-sensitive due to the sensitivity limitations inherent in capacitive solutions.

These problems can be overcome by creating a gap between the piezoresistive material and a sensor contact point that allows the piezoresistive material to deform slightly prior to contacting with a sensor contact point. The purpose of the gap is to ensure that there is a consistent starting point of force, pressure or other measured value such that even light touches can be picked up by the sensing circuit. This is accomplished by ensuring that when no pressure or force is applied to the sensor, a unique signal is measured because the two surfaces are inhibited from touching each other until enough pressure is applied. Any sensor contact points appropriate for the size for the particular touch interface application are suitable for the embodiments described.

Figure 9:
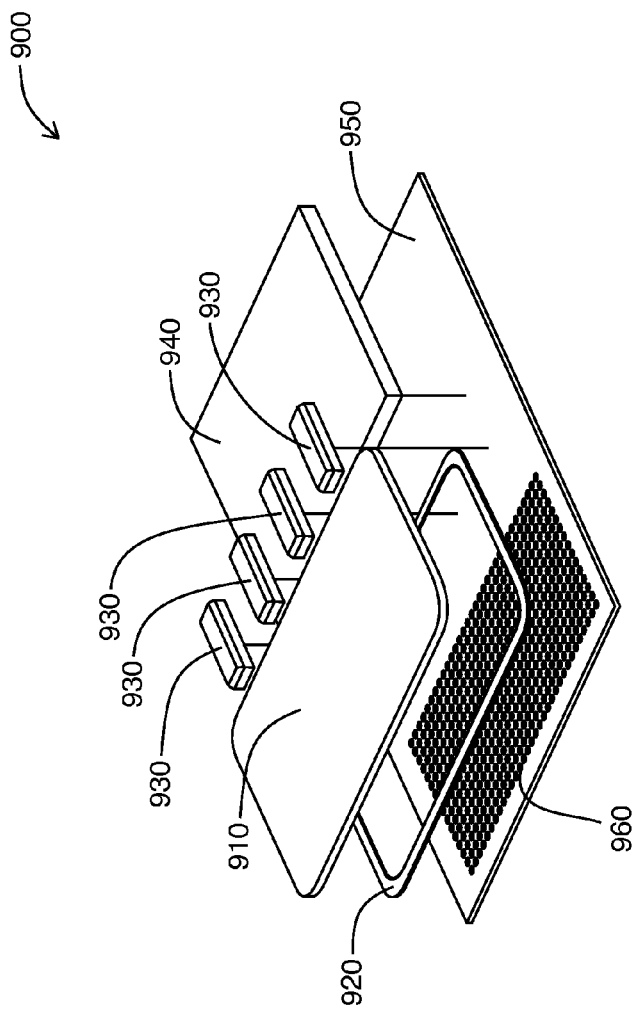
FIG. 9 is an exploded view of an interface device according to at least one embodiment.

Reference is now made to FIG. 9, which illustrates an exploded view of a touch interface device 900 according to various embodiments. Interface 900 comprises a touch layer 910 of a piezoresistive material, a ring of silver paint 920, a plurality of multiplexers 930, a microcontroller 940, and a circuit board 950. In some embodiments, circuit board 950 is a printed circuit board (PCB). In some embodiments, circuit board 950 can be other types of circuit boards such as a protoboard. In the embodiment illustrated, sensor contact points 960 are embedded in circuit board 950 such that the electrode is exposed to contact with touch layer 910 when it is exposed to a sufficient touch load. A gap between sensor contact points 960 and touch layer 910, described later in greater detail, is created by placing a raised adhesive or non-adhesive insulating (or non-conductive) layer of material between sensor contact points 960 and touch layer 910. Although some of the embodiments herein describe the gap in terms of an "air" gap, any suitable fluid, gel or gas medium that passively inhibits contact between the sensor contact points and the piezoresistive material may be substituted for "air". In some embodiments the fluid, gas or gel medium sufficiently inhibits contact between the piezoresistive material and the sensor contact points without need for the raised insulating (or non-conductive) layer.

In various embodiments, the user can press on touch layer 910 with his finger, or any object like a pencil, stylus, or glove. The user can press in multiple locations at the same time, where each press may vary in position, pressure, and shape of contact. In various embodiments each of these characteristics (e.g. position, pressure, shape and time) can be measured and determined. In addition, in various embodiments, the object that is used to touch the interface need not have any special properties (e.g. it need not be conductive).

In various embodiments, the sensor contact points are situated underneath touch layer 910. In some embodiments, the sensor points can comprise small pieces of copper. In some embodiments, any appropriate conductive metal can be used.

In some embodiments, the sensor points are physical contact points. For example, in resistive embodiments, the touch layer can come in physical contact with the sensor points and thereby change the voltage on the sensors.

In some embodiments, the surface of the material on the side exposed to the user is coated with a layer that is non-conductive, and much smoother than the base material, allowing a finger to easily slide along the surface. In various embodiments, this coating is not critical to the circuitry or function of the device, as only the underside of the material is used electrically.

In various embodiments, the material is conductive in that it carries a measurable charge across the surface and through the material. In some embodiments, the resistance of the material is uniform such that a voltage drop can be measured between two points on the surface that varies proportionally to the distance between the points.

As illustrated in FIG. 9, in various embodiments of touch interface device 900, the edges of the material are coated with conductive ink (very low resistance, like a wire), and connected to ground. Some embodiments in which the entire surface is grounded can produce more accurate results than embodiments in which only the edges are grounded. However, for the purposes of a human interaction-based touchpad, it is sufficient to, in some embodiments, ensure that all points on the surface are no more than 2 or 3 inches away from a point of ground.

Figure 10:
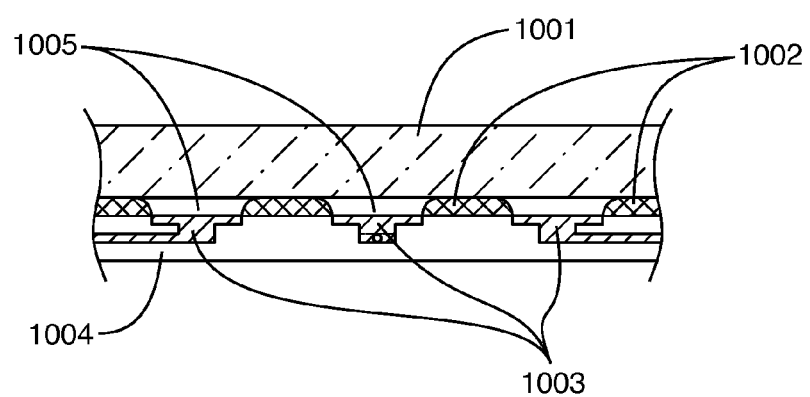
FIG. 10 illustrates the cross-section of a device board of a touch interface device according to at least one embodiment.

FIG. 10 illustrates the cross-section of device board 1000 for a touch interface of an exemplary embodiment. Interface device 1000 comprises touch layer 1001 of a piezoresistive material, insulating material 1002, sensor contact points 1003, circuit board 1004 and air gap 1005. Touch layer 1001 remains raised above a particular sensor contact points 1003 when the piezoresistive material is at rest (i.e. when not touch load has been applied to the particular sensor contact points 1003). The insulating (or non-conductive material) may be adhesive or non-adhesive.

Figure 11:
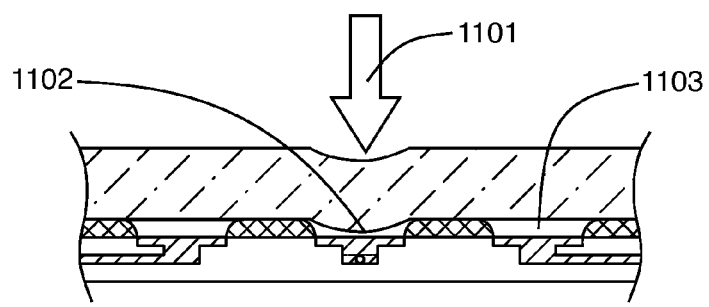
FIG. 11 illustrates the cross-section of FIG. 10 when a touch load is applied to the touch interface.

FIG. 11 illustrates the cross-section of device board 1000 when touch load 1101 is applied and physically contacts one of sensor contact points 1003 at point of contact 1102.

By way of reference to FIGS. 10 and 11, as soon as a touch load 1101 is applied to touch layer 1001, the piezoresistive material will deform slightly, contact the sensor (as illustrated by point of contact 1102), create an electrical connection between the sensor contact point and the material, and the light touch is recognized. As touch load 1101 increases and additional pressure is applied, the piezoresistive material of touch layer 1001 remains in contact with the sensor contact point, the measured output voltage and resistance changes, and the pressure is measured. As a result, at least this embodiment provides a 'pressure sensor'.

Figure 12:
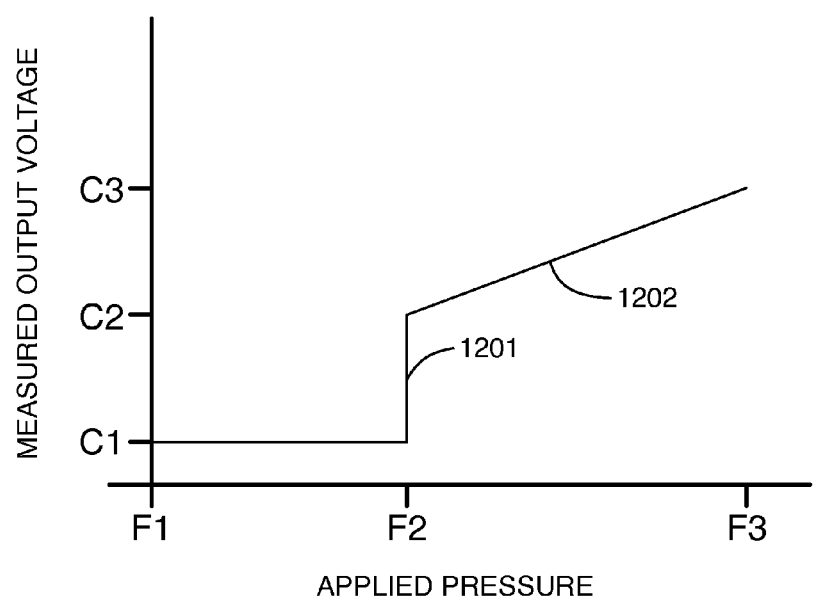
FIG. 12 is a diagram of the general relationship between conductivity and pressure.

The pressure sensitivity of this touch interface device can be characterized by a function representing the piezoresistive measured output voltage of the sensing circuit versus applied pressure. FIG. 12 generally illustrates this measured output voltage versus pressure relationship. "F1" represents a zero touch load pressure (i.e. starting and end conditions of a touch) and "C1" represents a measured output voltage value associated with zero level value of material conductivity. A touch load pressure between the values of "F1" and "F2" will result in no change in the measured output voltage and material's conductivity, and no electrical connection to a sensor. Therefore, "F2" is the "threshold pressure" required to activate the sensor. When this threshold pressure is applied there is a sudden and consistent change in measured output voltage and material conductivity, represented by pressure spike 1201, as the piezoresistive material of touch layer 1001 first makes contact with one of the sensor contact points 1003. An increase in the touch load results in an increase in the applied pressure, and the measured voltage and material conductivity will change continuously as illustrated by slope 1202. Any loads greater than "F2" can be mapped to the material's conductivity curve. After the load is removed, the measured pressure value will return to "F1" and the measured voltage will return to "C1" and a zero level value of material conductivity. FIG. 12 is provided for illustrative purposes only. The actual conductivity and pressure values will depend on the material, circuit and sensors employed in the particular embodiment.

Since a piezoresistive material changes resistance locally to an applied pressure, each sensor contact point must measure resistance independently. The measured resistance is then correlated back to a pressure value using a measured output voltage of the sensing circuit versus applied pressure, such as the curve shown in FIG. 12.

A simple voltage divider sensing circuit can be constructed to measure the pressure applied to each sensor. This is most clearly shown in FIG. 7, illustrating an exemplary embodiment, where the voltage divider is formed by constant resistor 701 and the resistance of the conductive material or the piezoresistive material (represented by resistor 705 in this embodiment). The voltage divider sensing circuit shown in FIG. 7 also comprises electrode 702 on the circuit board, signal condition circuit 703, voltage source 706 and output voltage signal 704. The voltage divider will measure the relative resistance between the material at the sensor contact point location and the constant resistor used, giving a unique value for a given pressure at each sensor.

The piezoresistive material used may vary depending on the particular embodiment. In each embodiment, an appropriate resistor relative to the particular material's resistance with and without pressure is utilized.

Figure 13:
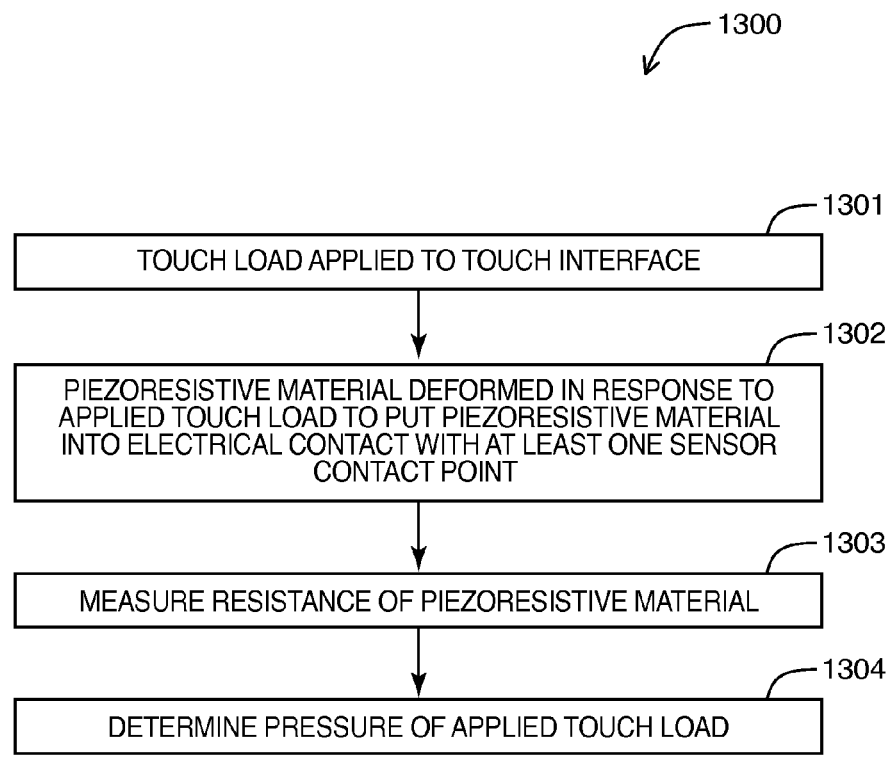
FIG. 13 is a flowchart of the steps used to determine the pressure of a touch load applied to a touch interface according to at least one embodiment.

FIG. 13 is a flowchart that illustrates the steps 1300 taken by the computing device with a touch interface of an exemplary embodiment to determine the pressure of a touch load applied to the touch interface. The process begins at step (1301), where a touch load is applied to the touch interface. At step (1302), the piezoresistive material is deformed locally to the location of the applied touch load such that it is in electrical contact with at least one sensor contact point. At step (1303), the resistance resulting from the deformed piezoresistive material is measured. At step (1304), the pressure is determined based upon the measured resistance.

In various embodiments, when there is only a single touch, the absolute pressure can be measured based on the resistance value for the rows, columns, and squares activated by the user's touch or press. In some embodiments, when simultaneous touches involve the same set of rows or columns, the "absolute" pressure is not measured. In such a situation, for some embodiments, the resistance value for the rows, columns, and squares activated by the user's touches or presses do not indicate the absolute pressure.

Using a suitable mapping algorithm, a "pressure map" can be created by mapping sensor values to positions on the grid of sensor contact points, such as, but not limited to, grid 200. If the touch interface's sensor contact point layout is similar to grid 200 is utilized, then the mapping algorithm described earlier in conjunction with grid 200 may be applied to map row, column and square sensor index values to the location index values of a particular sensor contact point to determine the associated touch point's location on the grid.

The raised insulating (or non-conductive) layer may comprise a raised structure. In some embodiments, this raised structure may be provided using a known silkscreen process, as illustrated by FIGS. 14A to 14D and 15. Regarding the silkscreen process, the contents of www(dot)businessknowledgesource(dot)com/manufacturing/the_use_of printed_circuit_boards_031369.html is incorporated herein in its entirety by reference. However, other processes may be used to create the gap in other embodiments.

Figure 15:
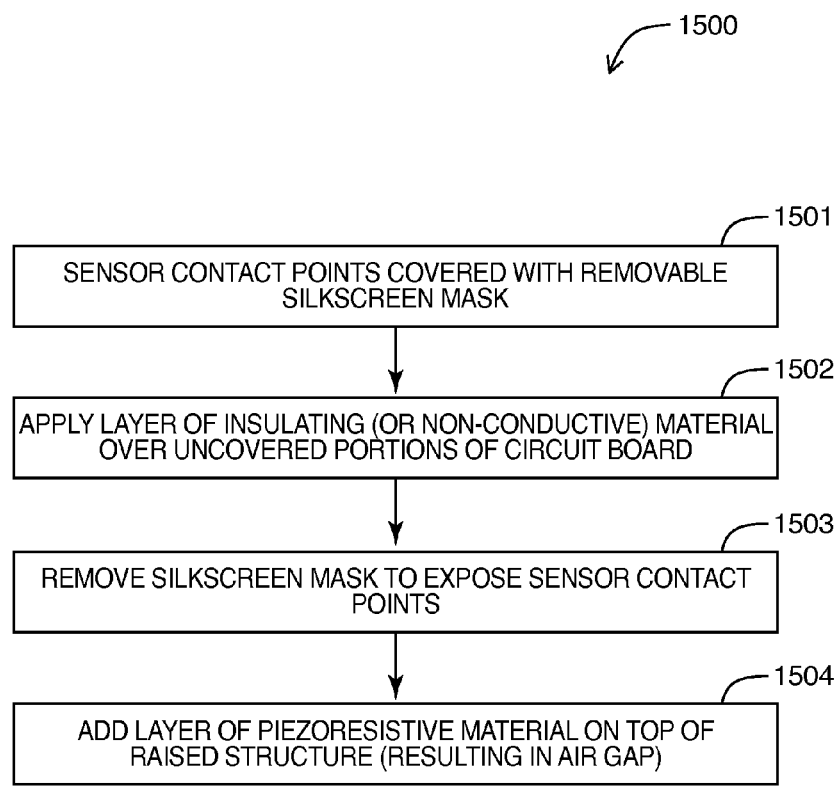
FIG. 15 is a flowchart of the steps used to create the raised configuration and create at least one gap according to at least one embodiment.

FIGS. 14A to 14D illustrate some of the components utilized by a suitable silkscreen process, such the process illustrated by FIG. 15. The components include, but are not limited to, removable silkscreen 1401, circuit board 1402, insulating layer 1403, sensor contact point (i.e. electrodes, sensor contact pads) 1404, piezoresistive material layer 1405 and gap 1406. The insulating layer may be adhesive or non-adhesive. In different embodiments, the insulating layer may be non-conductive.

FIG. 15 is a flowchart that illustrates the steps 1500 of a silkscreen process that may be used to add an insulating (or non-conductive) layer to raise the piezoresistive material layer above the sensor contact points and create a gap in accordance with various embodiments disclosed herein. Beginning at step (1501), the sensor contact points are covered by a removable silkscreen mask (see also FIG. 14A). At step (1502), an insulating layer of material is added over the uncovered portions of the circuit board (see also FIG. 14B). The thickness of this layer should be sufficient to create a gap between the piezoresistive material and sensor contact point. At step (1503), once the insulating layer has cured (i.e. set), then the silkscreen mask is removed and the sensor contact points on the circuit board are exposed (see also FIG. 14C). At step (1504), the piezoresistive material on top of the raised structure is added and a gap above the sensor contact point is created (see also FIG. 14D). It should be understood that any silkscreen process suitable to the embodiment can be used.

As a result of the pressure-sensitivity, there may be increased functionality of the computing device using the touch interface described. In some embodiments, pressing hard on an icon displayed on the touch interface enables icon editing, and allows them to be rearranged. Similarly, in some embodiments, a hard press on the background brings up the background menu control. In some embodiments, "pressing hard" means pressing with a force above a predetermined value. In some embodiments, a threshold value is selected and if the press or touch occurs with a force above the threshold value, then it is determined that the press was a hard press.

This increased functionality is used to provide multi-layered password recognition for computing devices (i.e. "3D passcodes"). Previous password recognition involves only the recognition of a correct combination of alphanumeric symbols to bypass the password screen. This type of password recognition is typically known as a "1D password lock".

In some embodiments, a second dimension of pressure-sensitivity can be used in conjunction with alphanumeric symbols to create a "3D passcode". In these embodiments, it is not just the sequence of inputs but also how hard each character is pressed that determines the passcode. For example, the password structure could look like:

| P | A | S | S | W | O | R | D |
|---|---|---|---|---|---|---|---|
| 1 | 1 | 2 | 2 | 1 | 2 | 1 | 3 | where a soft touch is represented by 1, a medium touch is represented by 2 and a hard touch is represented by 3. In this case, when the user inputs their password via the computing device, the characters "P", "A", "W", "R" are recorded with light touches, the two "S" symbols and "O" are recorded with moderate pressure touches, and the "D" is recorded with a hard touch. This new layer of information is hidden to witnesses and only known to the user themselves and is an additional layer of security. For example, simply observing or discovering the numbers or even the sequence of the numbers that are pressed on a lock would not be sufficient to discover the pass code. One would also need to know the pressure to apply.

In other embodiments, this pressure-sensitivity is used to help provide a personal security device. Different measured pressure levels can be associated with different levels of distress for the user. For example, one pressure setting can be associated with a "DISTRESS" mode. In some such embodiments, an alarm, including a silent alarm, can be triggered if a "DISTRESS" pressure is applied.

Although the above, examples were described with a single threshold and therefore two levels of pressing (hard and soft), some embodiments utilize multiple thresholds. Furthermore, for some embodiments rather than using discrete values of the level pressing the force of the press is measured on a continuous or almost continuous spectrum. For example, in some embodiments, an analog signal coded on 10 bits is measured. Such a signal can take on 1024 different values and therefore provides a large range of values that can be used to distinguish different levels of pressure.

Various embodiments described herein could also be applied to new controls for gaming. For example, the speed could depend on how hard the user presses the gas button. A similar arrangement could be used for braking.

In some embodiments, while browsing the web, pressing harder lets you zoom in.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

What is claimed is:

1. A multi-touch interface comprising:
a two-dimensional array of contact points, wherein the contact points are substantially uniformly distributed within the array such that each contact point is substantially equidistant from neighboring contact points located in vertical and horizontal directions;
wherein a first subset of contact points are electrically connected to form at least one first type of sensor, each first type of sensor comprising contact points electrically connected in a first direction;
wherein a second subset of contact points are electrically connected to form at least one second type of sensor, each second type of sensor comprising contact points electrically connected in a second direction, wherein the second subset of contact points comprise contact points other than the first subset of contact points, and wherein the second direction is orthogonal to the first direction; and wherein a third subset of contact points is divided into clusters of substantially locally distributed contact points, each of the clusters comprising contact points electrically connected to form a third type of sensor;
wherein the third subset of contact points comprises contact points other than the first and second subset of contact points; and
wherein each of the clusters is formed to provide an absolute location of one or more touch loads applied to the multi-touch interface.

2. The multi-touch interface of claim 1, wherein the first direction is a horizontal direction and the second direction is a vertical direction.

3. The multi-touch interface of claim 1, wherein each first type of sensor comprises adjoining contact points electrically connected in the first direction, and wherein each second type of sensor comprises adjoining contact points electrically connected in the second direction.

4. The multi-touch interface of claim 1, wherein each of the clusters' contact points forms a geometric shape.

5. The multi-touch interface of claim 1, wherein all the clusters are of equal size.

6. A method of determining characteristics of one or more touch loads applied to the multi-touch interface of claim 1, wherein the touch load is associated with a contact point in the two-dimensional array of contact points, the method comprising:
activating a plurality of contact points in response to the touch load, wherein the plurality of contact points comprise contact points that are part of the at least one first type of sensor, the at least one second type of sensor and the at least one third type of sensor;
associating a sensor location index with each first type of sensor, a second type of sensor, and a third type of sensor activated by the touch load; and
determining a location for the contact point associated with the touch load based on the sensor location index.

7. The method of claim 6, further comprising associating a sensor magnitude index with each first type of sensor, second type of sensor and third type of sensor activated by the touch load, and determining a magnitude for the contact point associated with the touch load based on the sensor magnitude index.

8. A multi-touch sensor mechanism comprising:
a two-dimensional array of contact points, wherein the contact points are substantially uniformly distributed within the array such that each contact point is substantially equidistant from neighboring contact points located in vertical and horizontal directions;
at least one conductive electrode pad corresponding to each contact point in the array;
a reference connection for providing connection to a reference signal; and
at least one circuit configured to provide an electrical measurement between each conductive electrode pad and the at least one reference connection when a touch event occurs;
wherein a first subset of contact points are electrically connected to form at least one first type of sensor, each first type of sensor comprising contact points electrically connected in a first direction;
wherein a second subset of contact points are electrically connected to form at least one second type of sensor, each second type of sensor comprising contact points electrically connected in a second direction, wherein the second subset of contact points comprise contact points other than the first subset of contact points, and wherein the second direction is orthogonal to the first direction; and wherein a third subset of contact points is divided into clusters of substantially locally distributed contact points, each of the clusters comprising contact points electrically connected to form a third type of sensor;

wherein the third subset of contact points comprises contact points other than the first and second subset of contact points; and wherein each of the clusters is formed to provide an absolute location of one or more touch loads applied to the multi-touch interface.

9. The multi-touch sensor mechanism of claim 8, further comprising at least one layer of piezoresistive material, wherein the at least one circuit is configured to measure resistance between each conductive electrode pad and the reference connection.

10. The multi-touch sensor mechanism of claim 9, wherein the reference connection is provided by an electrical connection to at least one location on the at least one layer of piezoresistive material.

11. The multi-touch sensor mechanism of claim 9, wherein an insulating structure is used to form a gap between each conductive electrode pad and the at least one layer of piezoresistive material.

12. The multi-touch sensor mechanism of claim 11, wherein the at least one conductive electrode pad is constructed by a multi-layer printed circuit board.

13. The multi-touch sensor mechanism of claim 12, wherein the insulating structure is formed by an insulating layer on the multi-layer printed circuit board.

14. The multi-touch sensor mechanism of claim 11, wherein the gap comprises an air gap.

15. The multi-touch sensor mechanism of claim 8, wherein the at least one circuit is configured to measure capacitance between each conductive electrode pad and the reference connection.

16. The multi-touch sensor mechanism of claim 8, wherein the reference connection is provided by a layer of highly conductive material.

17. A method of constructing a layout of contact points for a multi-touch interface, the method comprising:

providing a two-dimensional array of plurality of rows of contact points, wherein the contact points are substantially uniformly distributed within the array such that each contact point is substantially equidistant from neighboring contact points in vertical and horizontal directions;

electrically connecting a first subset of contact points to form at least one first type of sensor, each first type of sensor comprising contact points electrically connected in a first direction;

electrically connecting a second subset of contact points to form at least one second type of sensor, each second type of sensor comprising contact points electrically connected in a second direction;

wherein the second subset of contact points comprise contact points other than the first subset of contact points; and wherein the second direction is orthogonal to the first direction;

dividing a third subset of contact points, the third subset comprising contact points other than the first and second subset of contact points, into clusters of substantially locally distributed contact points; and electrically connecting contact points within each of the clusters to form a third type of sensor, wherein each cluster is formed to provide an absolute location of one or more touch loads applied to the multi-touch interface.

18. The method of claim 17, wherein the first direction is a horizontal direction and the second direction is a vertical direction.

19. The method of claim 17, wherein each first type of sensor comprises adjoining contact points electrically connected in the first direction, and wherein each second type of sensor comprises adjoining contact points electrically connected in the second direction.

* * * * *